US011803375B2

(12) United States Patent
Weldemariam et al.

(10) Patent No.: US 11,803,375 B2
(45) Date of Patent: Oct. 31, 2023

(54) CARBON-AWARE CODE OPTIMIZATION

(71) Applicant: International Business Machines Corporation, Armonk, NY (US)

(72) Inventors: Komminist Weldemariam, Ottawa (CA); Smitkumar Narotambhai Marvaniya, Bangalore (IN); Kedar Kulkarni, Bangalore (IN); Shantanu R. Godbole, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 257 days.

(21) Appl. No.: 17/346,388

(22) Filed: Jun. 14, 2021

(65) Prior Publication Data
US 2022/0398095 A1  Dec. 15, 2022

(51) Int. Cl.
*G06F 8/76* (2018.01)
*G06N 20/00* (2019.01)
*G06F 9/48* (2006.01)

(52) U.S. Cl.
CPC ............. *G06F 8/76* (2013.01); *G06F 9/4856* (2013.01); *G06N 20/00* (2019.01)

(58) Field of Classification Search
None
See application file for complete search history.

(56) References Cited

U.S. PATENT DOCUMENTS

| 8,087,013 | B2 | 12/2011 | Kelly |
| 8,600,571 | B2 | 12/2013 | Dillon |
| 9,207,993 | B2 | 12/2015 | Jain |
| 9,223,570 | B2 | 12/2015 | Kannan |
| 9,524,463 | B2 | 12/2016 | Meinrenken |
| 9,614,743 | B2 | 4/2017 | Htay |
| 9,760,474 | B2 | 9/2017 | Pillai |
| 10,027,738 | B2 | 7/2018 | Richman |
| 10,102,107 | B2 | 10/2018 | Darbha |
| 2009/0201293 | A1* | 8/2009 | Tung ............... G06Q 10/04  713/100 |
| 2009/0281846 | A1* | 11/2009 | Rose ............... G06Q 10/06  705/7.39 |
| 2012/0109705 | A1* | 5/2012 | Belady ............ G06F 9/5094  705/37 |
| 2017/0192758 | A1 | 7/2017 | Apte |
| 2020/0082289 | A1* | 3/2020 | Swierc ............ H02J 3/14 |
| 2020/0394164 | A1* | 12/2020 | Apte ............... G06F 16/2282 |

(Continued)

OTHER PUBLICATIONS

Alon et al., "code2vec: Learning Distributed Representations of Code", arXiv:1803.09473v5 [cs.LG] Oct. 30, 2018, 30 pages.

(Continued)

*Primary Examiner* — Qing Chen
(74) *Attorney, Agent, or Firm* — Stephen R. Yoder

(57) ABSTRACT

Embodiments of the present invention provide a computer system, a computer program product, and a method that comprises identifying a plurality of code datasets prior to a data migration; analyzing the identified code datasets for a plurality of parameters; dynamically predicting a carbon footprint associated with the analyzed code datasets based on the plurality of parameters for each analyzed code dataset; and automatically optimizing the analyzed code datasets based on the predicted carbon footprint for data migration.

16 Claims, 6 Drawing Sheets

(56) References Cited

U.S. PATENT DOCUMENTS

2021/0216978 A1* 7/2021 Diaz .................... G06Q 20/123
2022/0207414 A1* 6/2022 Bablani ..................... G06F 8/70

OTHER PUBLICATIONS

Cambronero et al., "When Deep Learning Met Code Search", arXiv:1905.03813v4 [cs.SE] Oct. 15, 2019, 11 pages.
Fu et al., "Estimating Software Energy Consumption with Machine Learning Approach by Software Performance Feature", © 2018 IEEE, DOI 10.1109/Cybermatics_2018.2018.00106, 7 pages.
Kumar et al., "Energy Consumption in Java: An Early Experience", c 2017 IEEE, 8 pages.
Shukla, Gaurav, "What You Can Do to Reduce the Carbon Footprint of Your Website", Last Updated: Jan. 8, 2021, 26 pages, <https://vwo.com/blog/reduce-website-carbon-footprint/>.
Williams, Howard, "Combating climate change with code", Oct. 18, 2018, 5 pages, <https://bdtechtalks.com/2018/10/18/reduce-energy-consumption-with-right-code/>.

* cited by examiner

306 — Carbon Emission for Optimized version on Database Connectivity
Carbon emission -> 60kg $CO_2$ (after 300 requests)

```
1  public class DatabaseConnection {
2      private DatabaseConnection instance;
3      private connection connection;
4      private String url = "jdbc:postgresql://localhost:5432/jdbc";
5      private String username = "root";
6      private String password = "localhost";
7
8      private DatabaseConnection() throws SOLException
9      try {
10         Class.forName("org.,postgresqLDriver");
11         this.connection = DriverManager.getConnection(u rl,
12             username, password);
13     } catch (ClassNotfoundExcept1on ex) {
14         System.out...println("Database Connection Creation Failed : '
15             + ex.getMessage());
16     }
17     }
18
19     public Connection getConnection() {
20         return connection;
21     }
22
23     public static DatabaseConnection getInstance() throws SQLException {
24         if (instance = = null) {
25             instance = new DatabaseConnection ();
26         } else if (instance.getConnection(). isClosed()) {
27             instance = new DatabaseConnection ();
28         }
29
30         return instance;
31     }
32  }
```

FIG. 3C

CARBON-AWARE CODE OPTIMIZATION

BACKGROUND

The present invention relates generally to the field of code optimization technology, and more specifically optimization of code during data migration and data transformation.

A carbon footprint is the total greenhouse gas emissions caused by an individual, event, organization, service or product, expressed as carbon dioxide equivalent. Greenhouse gases, including the carbon-containing gases carbon dioxide and methane, can be emitted through the burning of fossil fuels, land clearance and the production and consumption of food, manufactured goods, materials, wood, roads, buildings, transportation and other services.

Data migration is the process of moving data from one location to another, one format to another, or one application to another. Generally, this is the result of introducing a new system or location for the data. The business driver is usually an application migration or consolidation in which legacy systems are replaced or augmented by new applications that will share the same dataset. Currently, data migrations are often started as firms move from on-premises infrastructure and applications to remote-based storage and applications to optimize or transform.

In computing, a legacy system is an old method, technology, computer system, or application program relating to or being a previous or outdated computer system that is still in use. Often referencing a system as legacy means that it paved the way for the standards that would follow it. This can also imply that the system is out of data or in need of a replacement.

SUMMARY

Embodiments of the present invention provide a computer system, a computer program product, and a method that comprises identifying a plurality of code datasets prior to a data migration; analyzing the identified code datasets for a plurality of parameters; dynamically predicting a carbon footprint associated with the analyzed code datasets based on the plurality of parameters for each analyzed code dataset; and automatically optimizing the analyzed code datasets based on the predicted carbon footprint for data migration.

BRIEF DESCRIPTION OF THE DRAWINGS

FIG. 3A-3C is a set of exemplary snippets of code detailing calculation of carbon emissions and optimization of code based on calculated carbon emission, in accordance with at least one embodiment of the present invention.

DETAILED DESCRIPTION

Embodiments of the present invention improve the efficiency, reduce the risk of data loss, and reduce the cost of current data optimization technology by dynamically predicting a carbon footprint associated with a plurality of code datasets and automatically optimizing the plurality of code datasets based on the predicted carbon footprint for data migration. Current data optimization technology performs code optimization while migrating, transforming or modernizing data from legacy systems, but current data optimization technology fails to identify redundant data loops while simultaneously predicting carbon emission constraints of the identified data loops. Generally, current data optimization technology analyzes the code and validates criteria related to the analyzed code but fails to predict carbon emission metrics related to the analyzed code. Embodiments of the present invention improve the efficiency, reduce the risk of data loss, and reduce the cost of current data optimization technology by identifying a plurality of code datasets prior to subsequent data migration; predicting a carbon footprint associated with the identified plurality of code datasets; generating a query notification that provides recommendations for user based on the predicted carbon footprint; and automatically optimizing the identified plurality of code datasets based on the predicted carbon footprint.

Figure 1:
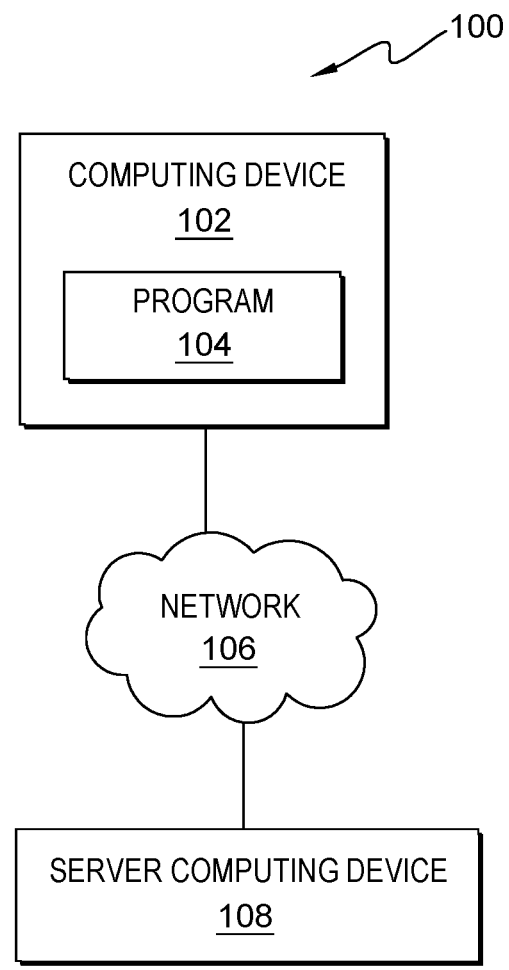
FIG. 1 is a functional block diagram depicting an environment with a computing device connected to or in communication with another computing device, in accordance with at least one embodiment of the present invention.

FIG. 1 is a functional block diagram of a computing environment 100 in accordance with an embodiment of the present invention. The computing environment 100 includes a computing device 102 and a server computing device 108. The computing device 102 and the server computing device 108 may be desktop computers, laptop computers, specialized computer servers, smart phones, wearable technology, or any other computing devices known in the art. In certain embodiments, the computing device 102 and the server computing device 108 may represent computing devices utilizing multiple computers or components to act as a single pool of seamless resources when accessed through a network 106. Generally, the computing device 102 and the server computing device 108 may be representative of any electronic devices, or a combination of electronic devices, capable of executing machine-readable program instructions, as described in greater detail with regard to FIG. 4.

The computing device may include a program 104. The program 104 may be a stand-alone program 104 on the computing device. In another embodiment, the program 104 may be stored on a server computing device 108. In this embodiment, the program 104 improves current data optimization technology by improving the efficiency, reducing the risk of data loss, and reducing the cost via dynamically predicting a carbon footprint associated with a plurality of code datasets and automatically optimizing the plurality of code datasets based on the predicted carbon footprint for data migration. In this embodiment, the program 104 dynamically predicts the carbon footprint by identifying a plurality of code datasets; analyzing the identified code datasets for a plurality of parameters, wherein the parameters are based on tracked carbon emission change, code dataset source change, and environmental variable change; and predicting the carbon footprint based on the analysis of the plurality of parameters associated with the identified code datasets. In this embodiment, the program 104 automatically optimizes the plurality of code datasets by determining a carbon emission range associated with the identified code datasets; removing any identified code dataset that does not fall within the determined carbon emission range; and automatically optimizing the remaining identified code datasets via ranking the identified code datasets based on the carbon footprint associated with each remaining identified code dataset.

In another embodiment, the program 104 trains a data model using paired code snippets and code comments; analyzes optimized code snippets based on the trained model; estimates the carbon emission constraints for the computing device 102 storing the analyzed, optimized code snippets based on identified code metadata using an embedding space algorithm; determines distances to neighboring code snippets within the data model based on an identified carbon emission constraint associated with the computing device 102; and verifies the analyzed, optimized code snippets does not meet or exceed a predetermined threshold of emission based on the identified carbon emission constraint using a dynamic code analysis. For example, the program 104 trains a Code2Vec data model that creates a single fixed-length vector from a code snippet, which can be used to predict semantic properties of the code snippet by decomposing the code snippet to a collection of paths in an abstract syntax tree. Further, the program 104 creates a Code to Code-Comment embedding data model that learns the atomic representation of each path in the collection of paths while simultaneously learning how to aggregate a set of paths. In yet another example, the program 104 estimates the carbon emission constraints of the green data center storing the data models by identifying data dependencies, library versions of data, and carbon emission metrics as code metadata. In this example, the program 104 calculates the carbon emission metric at code snippet level, class level REST end point level for a given analytic and the compute infrastructure configuration. In another embodiment, the program 104 uses a language data model as the trained data model. For example, the program 104 trains a language data model (i.e., a bidirectional encoder representation for transformers or "BERT") that has a sentence data encoder and code comments rather than paired code snippets. In this embodiment, the program 104 uses the embedding space to identify optimal practices for specific types of data, identify the need for conversion for specific types of data, and estimate the code rearrangement associated with the type of data. In this embodiment, the program 104 uses an artificial intelligence system to identify the cloud deployment configuration such that frequent communication between the microservice algorithm will be deployed in a same Kubernetes cluster such that some of the request authentication related overhead will be avoided.

The network 106 can be a local area network ("LAN"), a wide area network ("WAN") such as the Internet, or a combination of the two; and it may include wired, wireless or fiber optic connections. Generally, the network 106 can be any combination of connections and protocols that will support communication between the computing device 102 and the server computer 108, specifically the program 104 in accordance with a desired embodiment of the invention.

The server computer 108 communicates with the computing device 102 via the network 106. In this embodiment, the server computer 108 stores the identified code datasets, the determined carbon emission range, and the optimized order of identified code datasets made by the program 104 (not shown). In another embodiment, the server computer 108 may include the program 104.

Figure 2:
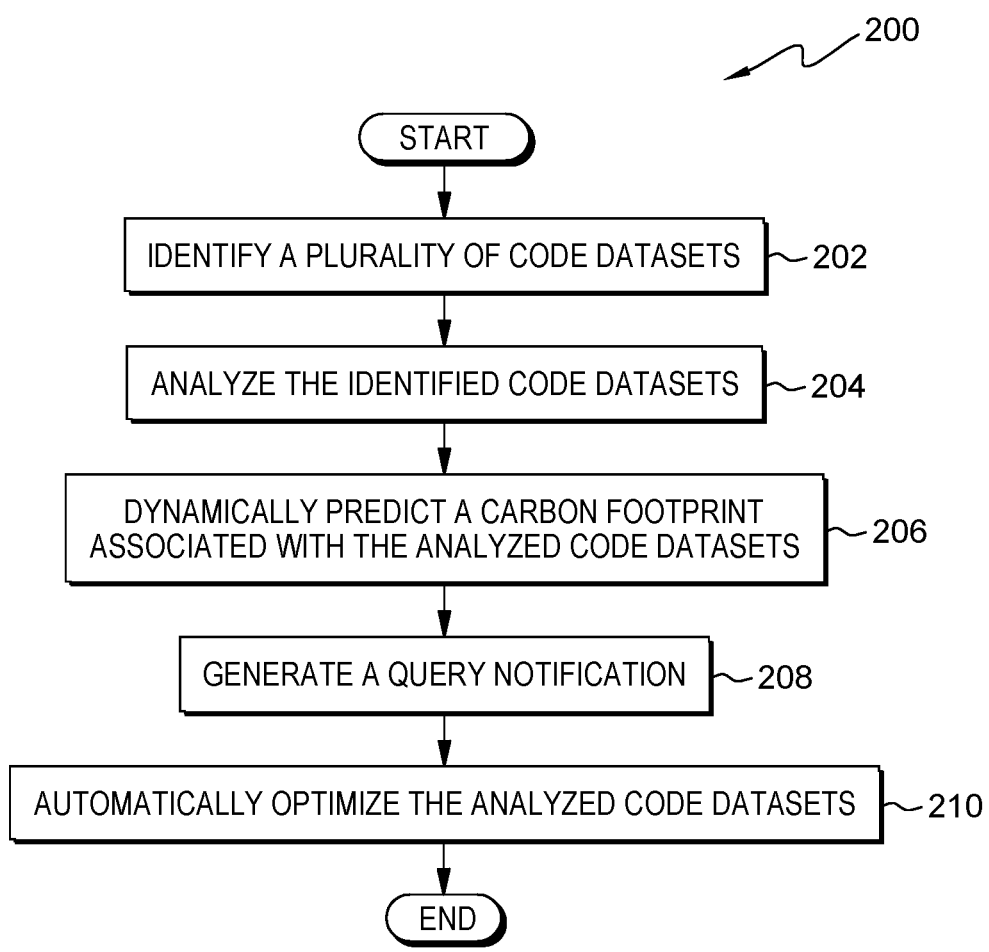
FIG. 2 is a flowchart illustrating operational steps for predicting a carbon footprint associated with a plurality of code snippets, in accordance with at least one embodiment of the present invention.

FIG. 2 is a flowchart 200 illustrating operational steps for dynamically optimizing a plurality of identified code datasets within a determined carbon emission range, in accordance with at least one embodiment of the present invention.

In step 202, the program 104 identifies a plurality of code datasets. In this embodiment, the program 104 identifies a plurality of code datasets within a legacy system. In this embodiment, the program 104 identifies the plurality of code datasets within the legacy system by scanning the legacy system for stored data to be migrated from an external database to the computing device 102 via a plurality of sensor devices. For example, the program 104 identifies a plurality of collaborative software development code datasets and a plurality of version-controlled code datasets stored within legacy system prior to being migrated to the computing device 102. In another embodiment, the program 104 identifies specific portions of code within the identified code dataset in need of optimization.

In another embodiment and in response to code commits within a code version control system, the program 104 identifies the plurality of code datasets that validates criteria associated with a plurality of input and output data requirements by comparing the criteria associated with the identified code datasets with to pre-stored criteria associated with the computing device 102. In another embodiment, the program 104 identifies the plurality of code datasets in response to analyzing code pull requests within the code version control system. In yet another embodiment, the program 104 identifies the plurality of code datasets based on an estimate change in the carbon emission associated with the determined level of the code commit.

In step 204, the program 104 analyzes the identified code datasets. In an embodiment, the program 104 analyzes the identified code datasets for a plurality of parameters. In this embodiment, the program 104 analyzes the identified code datasets by identifying carbon emission constraints associated with a type of data; performing a static and dynamic simulation analysis on the identified code datasets based on the identified carbon emission constraints; and positively matching at least one analyzed code dataset with an identified carbon emission constraint using machine learning algorithms and artificial intelligence algorithms. In this embodiment, the program 104 identifies carbon emission constraints by performing a query for an average carbon emission range associated with each type of data and identifying the maximum carbon emission value associated with the computing device 102. In this embodiment, the program 104 defines the carbon emission constraints as a maximum and minimum value on a range of carbon emission. For example, the carbon emission constraint can be the predetermined threshold of emission associated with the computing device 102. In this example, the program 104 has a carbon emission constraint of 0.819 kg $CO_2$e/kWh for a computing device 102 within a public cloud, a carbon emission constraint of 0.819 kg $CO_2$e/kWh for a computing device 102 within a private cloud. In another embodiment, the carbon emission constraint can assist in formulating target emissions and strategies associated with the computing device 102. In this embodiment, the program 104 uses the performed simulation of the code datasets to estimate whether the identified code data set will meet or exceed the identified carbon emission constraints. For example, the program 104 simulates the data migration of an embedding data model and estimates that the data migration of that type of code dataset associated with the embedding data model emits nine tons of carbon dioxide, which does not exceed the identified emission constraints of ten tons of carbon dioxide associated with the computing device 102. In this embodiment, the program 104 positively matches at least one paired set of parameters (i.e., metadata) associated with the identified code datasets. For example, the program 104 positively matches dependency data, library version data, and emission metric data between at least two data models. In this embodiment, the program 104 defines the parameters as factors that indicate the carbon emission output of the identified type of data. For example, the program 104 analyzes a code comment level within an on-premise not virtualized type of data by identifying the carbon emission output associated the on-premise not virtualized type of data as a parameter; a colocation not virtualized type of data by identifying the carbon emission output associated with the colocation not virtualized type of data as a parameter; an on-premise with virtualization type of data by identifying the carbon emission output associated with the on-premise with virtualization type of data as a parameter; a private cloud type of data by identifying the carbon emission output associated with the private cloud type of data as a parameter; and a public cloud type of data by identifying the carbon emission output associated with the public cloud type of data as a parameter. In yet another example, the program 104 analyzes a Code2Vec data model for carbon emission metric data type and dependency code data type as a the parameters associated with the Code2Vec data model. In another embodiment, the program 104 analyzes the identified code datasets for changes that impact (i.e., increase the carbon emission) a determination of whether identified code datasets fit within the identified carbon emission constraints associated with that type of data. For example, the program 104 analyzes the identified code datasets for tracked carbon emission changes, code dataset source changes, and environmental variable changes. In another embodiment, the program 104 analyzes the code datasets by analyzing historical code migration steps to understand optimal practices in the form of metadata. For example, the program 104 analyzes historical code migration steps for model, library, and microservice based data architecture for data migration.

In step 206, the program 104 dynamically predicts the carbon footprint associated with the analyzed code datasets. In this embodiment, the program 104 predicts the carbon footprint associated with the analyzed code datasets by identifying the carbon emission constraints, estimating a total carbon footprint for each code dataset, and predicting that the carbon footprint associated with each analyzed code dataset meets or exceeds a predetermined carbon threshold (i.e., carbon emission constraint). In this embodiment, the program 104 dynamically predicts the carbon footprint associated with storing the type of data based on an estimate of a server utilization rate and the carbon emission output associated with the data type of the analyzed code dataset within the computing device 102. For example, the program 104 dynamically predicts the amount of carbon dioxide emitted per kilowatt (e.g., cooling admissions, power requirements, as carbon emission constraints etc.) by the green data center for storing the Code2Vec data model for a predetermined period of time within a public cloud computing system. In this example, the program 104 dynamically predicts the carbon footprint associated with migrating the type of data associated with the analyzed code dataset from one data center to another data center by estimating server utilization rate for migrating each type of data and the carbon emission output for each type of data that the program 104 intends to migrate. In this embodiment, the program 104 dynamically predicts the carbon footprint associated with the analyzed dataset by monitoring the carbon emission level for a plurality of ameliorative actions using the code dataset. In this embodiment, the program 104 defines ameliorative action as any action that pertaining to a task. For example, ameliorate actions can include monitoring the carbon emission level (e.g., rationale for storing the identified code dataset), migrating the identified code dataset from one computing device to another computing device, and executing a function using the identified code dataset.

These functions can be any form of use of the computing device 102 that requires the use of the identified code dataset. In this embodiment, the program 104 defines carbon footprint as the total greenhouse gas emissions caused by a service or produce expressed as carbon dioxide equivalent. In this embodiment, the program 104 identifies the carbon emission constraints prior to estimating the total carbon footprint for each code dataset within the analyzed code data sets. In this embodiment, the program 104 identifies the carbon emission constraints by retrieving pre-stored carbon emission from a historical database stored on the computing device 102. In this embodiment, the program 104 estimates the total carbon footprint for each code dataset by calculating a carbon emission footprint for each code dataset and summing the calculated carbon emission footprint for the analyzed code datasets, which equals the total carbon footprint for the plurality of analyzed code datasets. In this embodiment, the program 104 defines the predetermined carbon threshold as the pre-set limit of carbon emission associated with the computing device, where meeting or exceeding puts the computing device 102 at risk of emitting an excess of carbon associated with migrating the data. For example, the program 104 identifies the predetermined carbon threshold for data migration of a code snippet pair using a cosine similarity algorithm as ten tons of carbon dioxide emitted within 24 hours. In this embodiment, the program 104 automatically rearranges the analyzed code datasets in response to predicting that the carbon footprint of the analyzed code dataset meets or exceeds the predetermined carbon threshold by modifying an order of the code snippets within the analyzed code datasets based on the predicted carbon emission footprint of the analyzed code dataset.

In this embodiment, the program 104 dynamically predicts the carbon footprint associated with the analyzed code dataset by determining a carbon emission range associated with the computing device 102. In this embodiment, the program 104 determines the carbon emission range associated with the computing device 102 by retrieving the carbon emission range associated with the type of data to be migrated from an external data source and identifying the predetermined carbon threshold stored on the computing device 102. In this embodiment, the program 104 determines the carbon emission range by averaging the minimum of each range and averaging the maximum of each range, resulting in a calculated carbon emission range.

In another embodiment, the program 104 tracks library version data and directional compatibility associated with the code dataset, while simultaneously tracking carbon emissions for each function of the code dataset by continually monitoring the code dataset preforming a plurality of ameliorative actions and dynamically calculating the carbon emission output for each monitored ameliorative action of the code dataset. In this embodiment and in response to calculating the carbon emission output, the program 104 automatically terminates the operation of the computing device when the carbon emission output meets or exceeds the predetermined carbon emission threshold. In this embodiment, the program 104 automatically generates library version recommendations for the code dataset based on the carbon emission constraints associated with the computing device 102 and the type of data associated with the code dataset.

In step 208, the program 104 generates a query notification. In this embodiment, the program 104 generates a query notification based on the predicted carbon emission meeting or exceeding the predetermined carbon threshold. In this embodiment, the program 104 displays the estimated carbon footprint of the analyzed code dataset within the generated notification and the maximum value associated with the carbon emission constraint of the computing device 102. In this embodiment, the program 104 alerts a user that the analyzed code dataset meets or exceeds the predetermined carbon threshold through the generated notification. In this embodiment, the program 104 displays the generated notification on a graphic user interface within the computing device 102. In this embodiment, the program 104 generates a query notification directed to the user through a user interface within the computing device 102 that provides recommendations on the analyzed code datasets and the predicted carbon emission associated with each analyzed code dataset. For example, the program 104 generates an automated chat bot that details the carbon emission for each analyzed code dataset. In another embodiment, the program 104 generates recommendations for a user to remove or modify the analyzed code datasets prior to data migration to ensure that the analyzed code dataset does not meet or exceed the predetermined carbon threshold. In this embodiment and in response to generating recommendations for the user, the program 104 uses the preferences of the user determined the generated query notification as input for future analysis of code datasets prior to future data migration. In this embodiment, the program 104 captures preferences of the user, carbon emission constraints of the user, and corresponding recommendations during data migration via the generated notification.

In another embodiment, the program 104 generates the query notification within an integrated development environment. In this embodiment, the program 104 generates the query notification within the integrated development environment based on the predicted carbon emission meeting or exceeding the predetermined carbon threshold. For example, the program 104 generates a notification detailing the predicted carbon emission as a user writes code within the integrated development environment. In another example, the program 104 generates the notification detailed the predicted carbon emission as a user modifies existing code within the integrated development environment.

In step 210, the program 104 automatically optimizes the analyzed plurality of code datasets based on the predicted carbon footprint and the generated recommendations. In this embodiment, the program 104 automatically optimizes the analyzed plurality of code datasets by determining the carbon emission constraints associated with the analyzed code datasets; modifying an arrangement of analyzed code dataset that does not fall within the average carbon emission constraints (i.e., meets or exceeds the predetermined carbon threshold); and automatically optimizing the remaining identified code datasets via ranking the remaining analyzed code datasets based on the carbon footprint associated with each remaining identified code dataset. In this embodiment, the program 104 determines the carbon emission constraints by averaging a maximum carbon emission value associated with the predetermined carbon threshold (i.e., carbon emission constraints) associated with the computing device 102 and the predicted carbon footprint associated with the type of data corresponds with the analyzed code dataset. For example, the program 104 identifies that the predetermined carbon threshold has a maximum of 3.9 carbon emission level ("cbl") green datacenter storing the data model and the predicted carbon footprint of the code snippets within the Code2Vec data model has a minimum of 1.5 cbl ad a maximum of 4.0 cbl, resulting in an averaged carbon emission constraint with of 3.95 cbl.

In this embodiment, the program 104 modifies the analyzed code dataset. In this embodiment, the program 104 modifies the analyzed code dataset by rearranging each analyzed code dataset based on the calculated carbon emission range using a microservice algorithm. In this embodiment, the program 104 rearranges each analyzed code dataset by placing analyzed code datasets with a lower predicted carbon footprint at a higher priority than analyzed code datasets with a higher predicted carbon footprint. In this embodiment, the program 104 reduces the carbon footprint through the rearrangement of the analyzed code dataset that reduces the resources needed during a code deployment phase via nitration of the carbon-aware code monitoring plugin during a code development phase. In this embodiment, the program 104 ensures that the entire code snippet being rearranged does not hinder the performance of the code by generating a copy of the code snippets in case the rearrangement damages original source code data. In this embodiment, the program 104 dynamically rearranges the architecture of each analyzed code dataset based on the predicted carbon footprint associated with each analyzed code dataset by removing and reordering specific datasets within the analyzed code dataset that meets or exceeds the predetermined carbon threshold using a microservice infrastructure. In another embodiment, the program 104 modifies the analyzed dataset by highlighting the analyzed code dataset with the higher predicted carbon footprint a color that is different from the remaining analyzed code dataset. For example, the program 104 highlights the analyzed code data with a predicted carbon footprint exceeding the predetermined carbon emission threshold the color green, while the remaining analyzed code datasets are color highlighted. In this embodiment, the program 104 reduces the carbon footprint of the analyzed code dataset by removing specific datasets based on received user input in the form of a user carbon emission constraint that is outside of the identified carbon emission constraints associated with the computing device 102 and the type of data. In another embodiment, the program 104 reallocates resources that rearrange the analyzed code datasets into a plurality of designs within a data architecture in response to the preferences of the user associated with the carbon emission constraints using the microservice algorithm. In this embodiment, the program 104 defines the architecture as any division of a monolithic data architecture, such as a microservice.

In this embodiment, the program 104 automatically optimizes the modified code datasets. In this embodiment and in response to rearranging the analyzed code datasets, the program 104 automatically optimizes the modified code datasets for data migration based on the rearrangement of the code datasets and the calculated carbon emission constraints. In this embodiment, the program 104 automatically optimizes the modified code datasets by rearranging code snippets within the analyzed code dataset into microservice data architecture using machine learning algorithms and artificial intelligence algorithms. In this embodiment, the program 104 optimizes the modified code datasets by generating a response to the user during data migration within the generated notification. For example, the program 104 provides the user with pareto solutions for the data migration based on the optimized code dataset meeting the carbon emission constraints of the user, code performance requirement of the user, and cost constraints of the user. In another embodiment, the program 104 automatically optimizes the rearranged code datasets by periodically tracking code commits to identify code changes and perform carbon emission calculations based on received preferences of the user. In yet another embodiment, the program 104 optimizes the code data set by generating a second code snippet that is identical in functional and identical in code to the modified code dataset using a carbon-aware code snippet generator. In this embodiment, the program 104 defines the carbon-aware code snippet generator as a program that removes snippets (i.e., small sections) of code that meet or exceed the predetermined carbon threshold within the modified code datasets. In another embodiment, the carbon-aware code snippet generator receives instructions from the program 104 to automatically optimize the modified code datasets by removing any code dataset that is not within the carbon emission constraints associated with the computing device 102 prior to migrating the data.

Figure 3A:
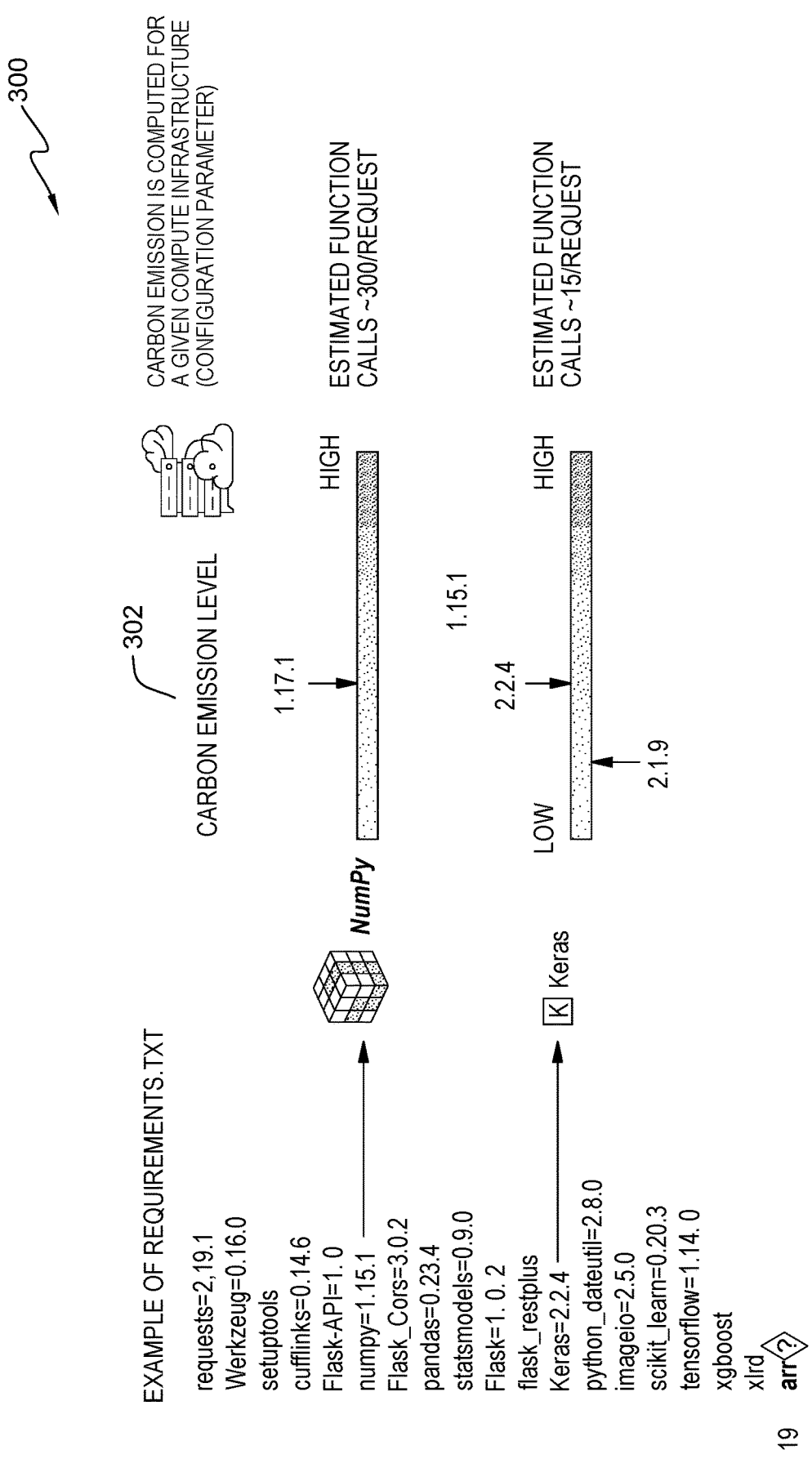
Figure 3B:
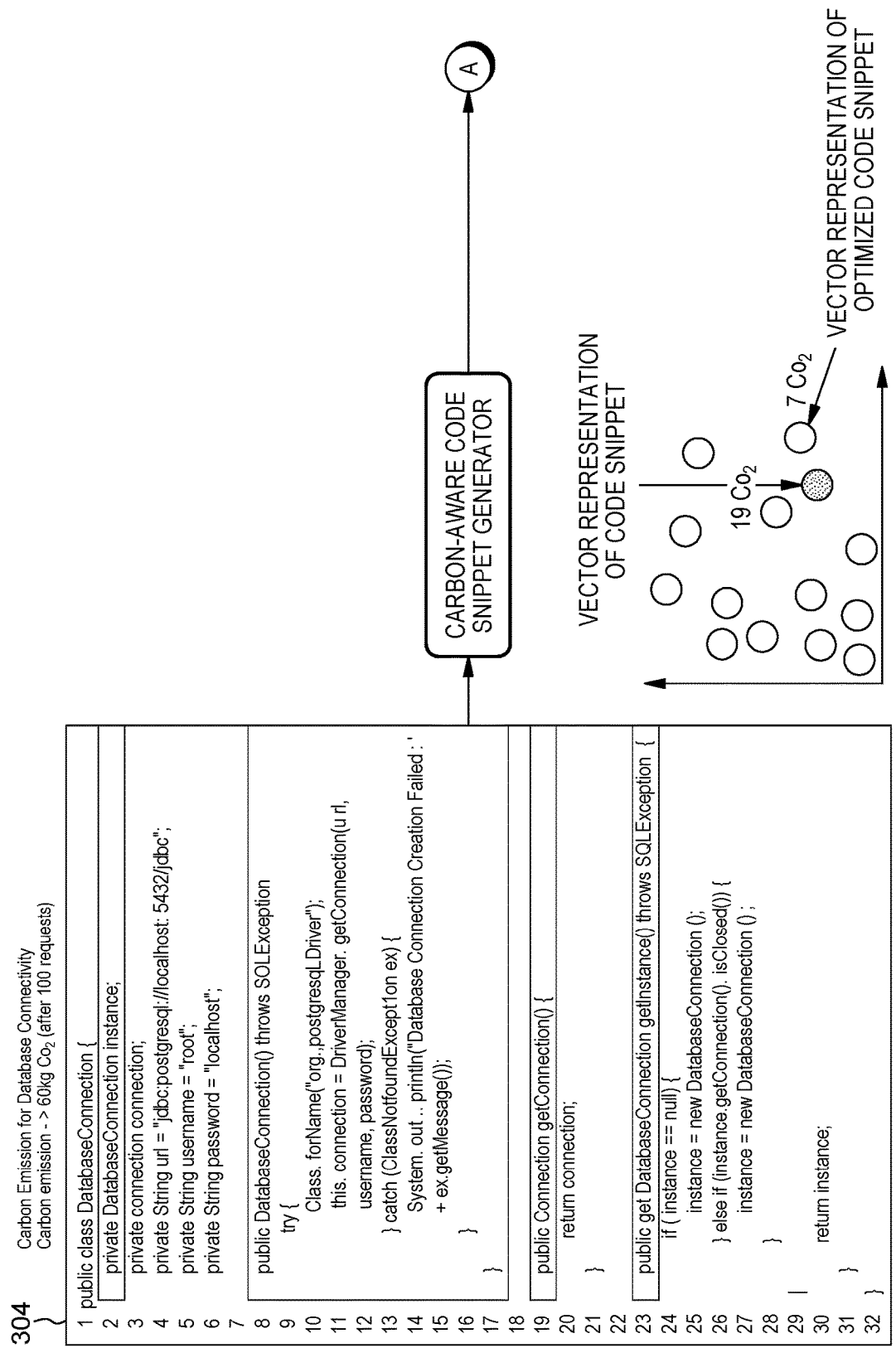

FIG. 3A-3C is a set 300 of exemplary snippets of code detailing calculation of carbon emissions and optimization of code based on calculated carbon emission, in accordance with at least one embodiment of the present invention.

In example 302, the program 104 calculates the carbon emission for a code dataset. In this example, the program 104 calculates the carbon emission levels for two computer infrastructures and displays the carbon emission level with respect to the carbon emission constraint associated with each computer infrastructure. In this example, there is sample code that details the carbon emission constraints for a given computer infrastructure. In this example, there are two separate computer infrastructures and each with its own carbon emission constraints. The first computer infrastructure is associated with NumPy and displays a carbon emission level of 1.17.1 based on an estimated function call of approximately 300 requests. In this example, the carbon emission level is less than half of the depicted carbon emission constraint associated with NumPy. The second computer infrastructure is associated with Keras and displays two carbon emission levels of 2.1.9 and 2.2.4 based on an estimated function call of approximately 15 requests. In this example, the carbon emission levels are less than half of the depicted carbon emission constraint associated with Keras.

In example 304, the program 104 displays sample code for calculating a carbon emission level for a database connectivity dataset. In this example, the program 104 calculates that the database connectivity dataset emits at least 60 kilograms of carbon dioxide for at least 100 code requests. In this example, the code requests are code pulls, code commits, and code pushes. In example 306, the program 104 displays sample code for calculating the carbon emission level for an optimized database connectivity dataset. In this example, the program 104 calculates that the optimized database connectivity dataset emits no more than 60 kilograms of carbon dioxide for at least 300 requests.

Figure 4:
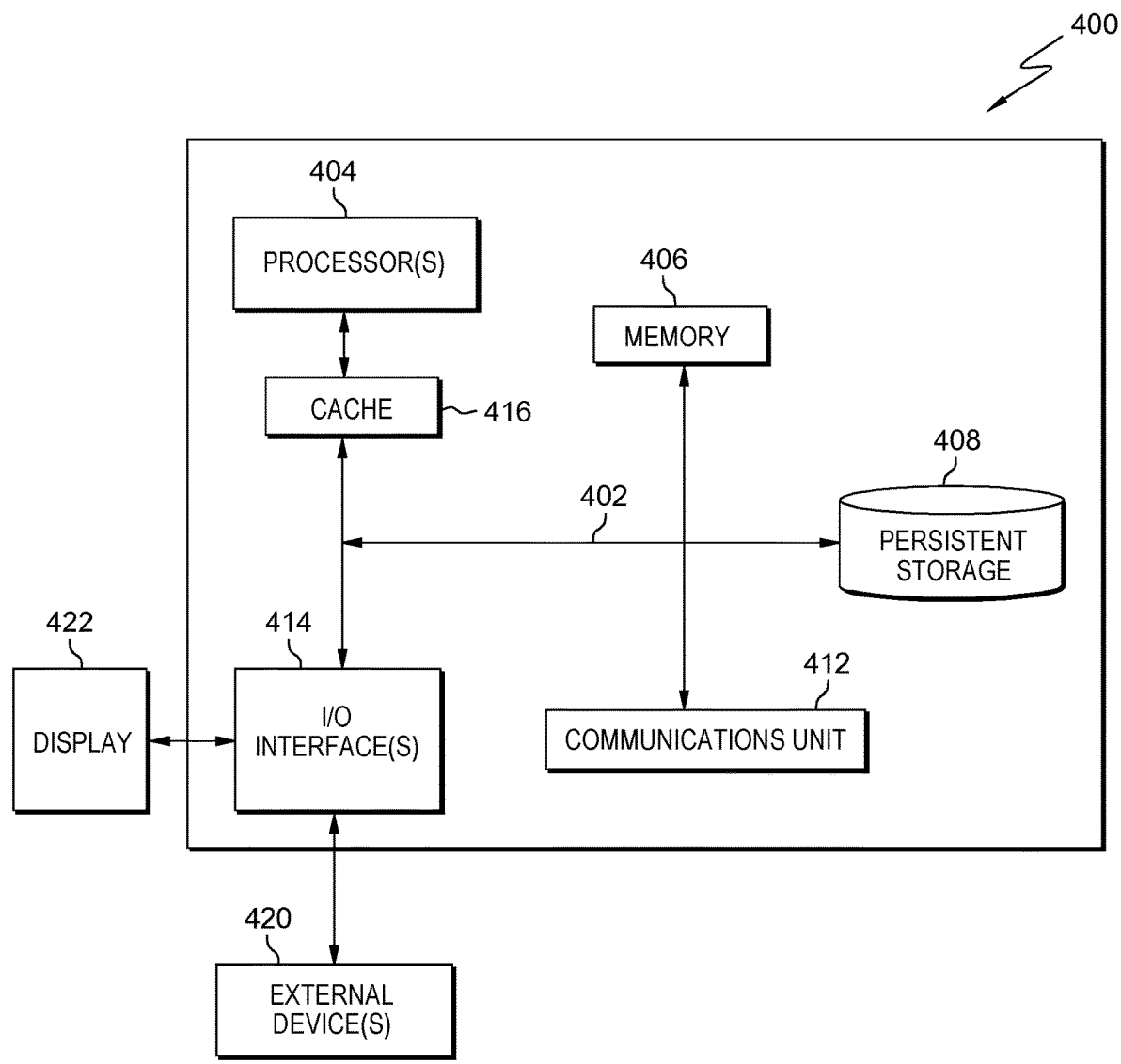
FIG. 4 depicts a block diagram of components of computing systems within a computing display environment of FIG. 1, in accordance with an embodiment of the present invention.

FIG. 4 depicts a block diagram of components of computing systems within a computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

A computer system 400 includes a communications fabric 402, which provides communications between a cache 416, a memory 406, a persistent storage 408, a communications unit 412, and an input/output (I/O) interface(s) 414. The communications fabric 402 can be implemented with any architecture designed for passing data and/or control information between processors (such as microprocessors, communications and network processors, etc.), system memory, peripheral devices, and any other hardware components within a system. For example, the communications fabric 402 can be implemented with one or more buses or a crossbar switch.

The memory 406 and the persistent storage 408 are computer readable storage media. In this embodiment, the memory 406 includes random access memory (RAM). In general, the memory 406 can include any suitable volatile or non-volatile computer readable storage media. The cache 416 is a fast memory that enhances the performance of the computer processor(s) 404 by holding recently accessed data, and data near accessed data, from the memory 406.

The program 104 may be stored in the persistent storage 408 and in the memory 406 for execution by one or more of the respective computer processors 404 via the cache 416. In an embodiment, the persistent storage 408 includes a magnetic hard disk drive. Alternatively, or in addition to a magnetic hard disk drive, the persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by the persistent storage 408 may also be removable. For example, a removable hard drive may be used for the persistent storage 408. Other examples include optical and magnetic disks, thumb drives, and smart cards that are inserted into a drive for transfer onto another computer readable storage medium that is also part of the persistent storage 408.

The communications unit 412, in these examples, provides for communications with other data processing systems or devices. In these examples, the communications unit 412 includes one or more network interface cards. The communications unit 412 may provide communications through the use of either or both physical and wireless communications links. The program 104 may be downloaded to the persistent storage 408 through the communications unit 412.

The I/O interface(s) 414 allows for input and output of data with other devices that may be connected to a mobile device, an approval device, and/or the server computing device 108. For example, the I/O interface 414 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards. Software and data used to practice embodiments of the present invention, e.g., the program 104, can be stored on such portable computer readable storage media and can be loaded onto the persistent storage 408 via the I/O interface(s) 414. The I/O interface(s) 414 also connect to a display 422.

The display 422 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
identifying a plurality of code datasets prior to a data migration;
analyzing the identified plurality of code datasets for a plurality of parameters;
identifying carbon emission constraints associated with a type of code dataset;
performing a simulation analysis on the identified plurality of code datasets based on the identified carbon emission constraints;
comparing at least one analyzed code dataset with an identified carbon emission constraint using machine learning algorithms and artificial intelligence algorithms based on the performed simulation analysis;
dynamically predicting a carbon footprint associated with the analyzed plurality of code datasets based on the plurality of parameters for each analyzed code dataset within the analyzed plurality of code datasets;
generating a query notification within an integrated development environment that provides recommendations for a user based on the dynamically predicted carbon footprint; and
automatically optimizing the analyzed plurality of code datasets based on the dynamically predicted carbon footprint for data migration.

2. The computer-implemented method of claim 1, wherein identifying the plurality of code datasets comprises scanning a legacy system for stored data for the data migration from an external database to a computing device.

3. The computer-implemented method of claim 1, wherein dynamically predicting the carbon footprint comprises:
estimating a total carbon footprint for each analyzed code dataset within the analyzed plurality of code datasets; and
predicting the total carbon footprint associated with each analyzed code dataset within the analyzed plurality of code datasets meets or exceeds a predetermined carbon emission threshold based on a comparison to the estimated total carbon footprint.

4. The computer-implemented method of claim 3, wherein estimating the total carbon footprint comprises:
calculating a carbon emission footprint for each analyzed code dataset within the analyzed plurality of code datasets; and
summing the calculated carbon emission footprint for each analyzed code datasets within the analyzed plurality of code datasets.

5. The computer-implemented method of claim 1, wherein automatically optimizing the analyzed plurality of code datasets comprises:
determining a carbon emission range associated with the analyzed plurality of code datasets, wherein the determined carbon emission range is based on a predetermined threshold of carbon emission associated with a computing device;
modifying an arrangement of analyzed plurality of code datasets that does not fall within the determined carbon emission range; and
automatically optimizing the modified arrangement of analyzed plurality of code datasets by removing modified code datasets of the modified arrangement of analyzed plurality of code datasets that did not fall within the determined carbon emission range based on a carbon footprint associated with each modified code dataset of the modified arrangement of analyzed plurality of code datasets that has been removed.

6. The computer-implemented method of claim 5, wherein modifying the arrangement of analyzed plurality of code datasets comprises rearranging each analyzed code dataset within the arrangement of analyzed plurality of code datasets based on the determined carbon emission range using a microservice algorithm.

7. A computer program product comprising:
one or more computer readable storage media and program instructions stored on the one or more computer readable storage media, the program instructions comprising:
program instructions to identify a plurality of code datasets prior to a data migration;
program instructions to analyze the identified plurality of code datasets for a plurality of parameters;
program instructions to identify carbon emission constraints associated with a type of code dataset;
program instructions to perform a simulation analysis on the identified plurality of code datasets based on the identified carbon emission constraints;
program instructions to compare at least one analyzed code dataset with an identified carbon emission constraint using machine learning algorithms and artificial intelligence algorithms based on the performed simulation analysis;
program instructions to dynamically predict a carbon footprint associated with the analyzed plurality of code datasets based on the plurality of parameters for each analyzed code dataset within the analyzed plurality of code datasets;
program instructions to generate a query notification within an integrated development environment that provides recommendations for a user based on the dynamically predicted carbon footprint; and
program instructions to automatically optimize the analyzed plurality of code datasets based on the dynamically predicted carbon footprint for data migration.

8. The computer program product of claim 7, wherein the program instructions to identify the plurality of code datasets comprise program instructions to scan a legacy system for stored data for the data migration from an external database to a computing device.

9. The computer program product of claim 7, wherein the program instructions to dynamically predict the carbon footprint comprise:
program instructions to estimate a total carbon footprint for each analyzed code dataset within the analyzed plurality of code datasets; and
program instructions to predict the total carbon footprint associated with each analyzed code dataset within the analyzed plurality of code datasets meets or exceeds a predetermined carbon emission threshold based on a comparison to the estimated total carbon footprint.

10. The computer program product of claim 9, wherein the program instructions to estimate the total carbon footprint comprise:
program instructions to calculate a carbon emission footprint for each analyzed code dataset within the analyzed plurality of code datasets; and
program instructions to sum the calculated carbon emission footprint for each analyzed code datasets within the analyzed plurality of code datasets.

11. The computer program product of claim 7, wherein the program instructions to automatically optimize the analyzed plurality of code datasets comprise:
   program instructions to determine a carbon emission range associated with the analyzed plurality of code datasets, wherein the determined carbon emission range is based on a predetermined threshold of carbon emission associated with a computing device;
   program instructions to modify an arrangement of analyzed plurality of code datasets that does not fall within the determined carbon emission range; and
   program instructions to automatically optimize the modified arrangement of analyzed plurality of code datasets by removing modified code datasets of the modified arrangement of analyzed plurality of code datasets that did not fall within the determined carbon emission range based on a carbon footprint associated with each modified code dataset of the modified arrangement of analyzed plurality of code datasets that has been removed.

12. The computer program product of claim 11, wherein the program instructions to modify the arrangement of analyzed plurality of code datasets comprise program instructions to rearrange each analyzed code dataset within the arrangement of analyzed plurality of code datasets based on the determined carbon emission range using a microservice algorithm.

13. A computer system comprising:
   one or more computer processors;
   one or more computer readable storage media; and
   program instructions stored on the one or more computer readable storage media for execution by at least one of the one or more computer processors, the program instructions comprising:
      program instructions to identify a plurality of code datasets prior to a data migration;
      program instructions to analyze the identified plurality of code datasets for a plurality of parameters;
      program instructions to identify carbon emission constraints associated with a type of code dataset;
      program instructions to perform a simulation analysis on the identified plurality of code datasets based on the identified carbon emission constraints;
      program instructions to compare at least one analyzed code dataset with an identified carbon emission constraint using machine learning algorithms and artificial intelligence algorithms based on the performed simulation analysis;
      program instructions to dynamically predict a carbon footprint associated with the analyzed plurality of code datasets based on the plurality of parameters for each analyzed code dataset within the analyzed plurality of code datasets;
      program instructions to generate a query notification within an integrated development environment that provides recommendations for a user based on the dynamically predicted carbon footprint; and
      program instructions to automatically optimize the analyzed plurality of code datasets based on the dynamically predicted carbon footprint for data migration.

14. The computer system of claim 13, wherein the program instructions to identify the plurality of code datasets comprise program instructions to scan a legacy system for stored data for the data migration from an external database to a computing device.

15. The computer system of claim 13, wherein the program instructions to dynamically predict the carbon footprint comprise:
   program instructions to estimate a total carbon footprint for each analyzed code dataset within the analyzed plurality of code datasets; and
   program instructions to predict the total carbon footprint associated with each analyzed code dataset within the analyzed plurality of code datasets meets or exceeds a predetermined carbon emission threshold based on a comparison to the estimated total carbon footprint.

16. The computer system of claim 15, wherein the program instructions to estimate the total carbon footprint comprise:
   program instructions to calculate a carbon emission footprint for each analyzed code dataset within the analyzed plurality of code datasets; and
   program instructions to sum the calculated carbon emission footprint for each analyzed code datasets within the analyzed plurality of code datasets.

* * * * *